United States Patent [19]

Simerl

[11] 4,102,188

[45] Jul. 25, 1978

[54] PORTABLE ANEMOMETER WITH COLLAPSIBLE ROTORS

[76] Inventor: R. A. Simerl, 528 Epping Forest Rd., Annapolis, Md. 21401

[21] Appl. No.: 822,325

[22] Filed: Aug. 5, 1977

[51] Int. Cl.² ............................................. G01F 1/06
[52] U.S. Cl. ..................................... 73/170 R; 73/229
[58] Field of Search .................... 73/189, 229, 194 R, 73/155, 228, 185, 170 R

[56] References Cited

U.S. PATENT DOCUMENTS 3,557,617  1/1971  Wilson et al. ...................... 73/189 X
3,934,467  1/1976  Nicolas ............................. 73/229 X

*Primary Examiner*—Jerry W. Myracle
*Attorney, Agent, or Firm*—W. Britton Moore

[57] ABSTRACT

A portable type anemometer having light weight wind rotor cups arranged on arms extending radially from and pivotally connected to a spindle vertically journalled within and extending from a housing including apparatus for monitoring shaft rotation and registering wind velocity. The arms and cups are collapsible from active horizontal positions to upstanding generally parallel inactive vertical positions for anemometer storage purposes.

7 Claims, 6 Drawing Figures

PORTABLE ANEMOMETER WITH COLLAPSIBLE ROTORS

This invention relates to a portable type anemometer having light weight rotor cups arranged on arms extending radially from and pivotally connected to a spindle vertically journalled within and extending from a housing, and wherein the arms and cups are collapsible from horizontal active to upstanding inactive positions for anemometer storage purposes.

Anemometers with cup shaped rotors have heretofore been provided, such as those for example, represented by U.S. patents to Bonanno U.S. Pat. No. 3,119,261, Turner U.S. Pat. No. 3,465,584, Frenzen et al. U.S. Pat. No. 3,541,855, and Jones U.S. Pat. No. 3,699,801, but the cups and supporting arms thereof are fixedly connected to the spindles and are not foldable or collapsible with respect thereto which tends to reflect on the fidelity of these instruments and presents very definite storage problems.

The principal object of the present invention is to provide a portable type anemometer wherein light weight plastic rotor cups arranged on radial arms are pivotally connected at the bases thereof to a spindle journalled in a housing so as to be collapsible or foldable from active horizontal positions to upstanding inactive positions for storage purposes.

Another object is the provision of rotor cups and arms pivotally connected at their bases to spaced links in a cap member removably arranged on and supported by a vertical spindle whereby the arms and links are arcuately pivoted upwardly to generally parallel vertical collapsed positions.

Still another object is to provide a portable type anemometer wherein the cap member is of light weight plastic material and formed in two interconnected parts having spaced vertical slots to accommodate links pivoted to one part thereof and to the bases of the cup carrying arms wherein upward sliding movement of the cap member relative to the spindle causes the arms and cups to pivot inwardly and upwardly to collapsed positions above and generally parallel to the cap member and spindle.

A further object is the provision of a plastic two part slotted spider assembly cap member formed with a downwardly depending split tubular hub portion having an inturned lip at the lower end thereof engageable with spaced annular grooves in the spindle so that the cap member may be vertically and releasably slidably adjusted relative thereto during pivotal movement of the links and cup arms between active and inactive positions.

These and other objects and advantages will be apparent as the specification is considered with the accompanying drawings, wherein FIG. 1 is a perspective view of the anemometer showing the rotor arms in active horizontal positions;

Figure 2:
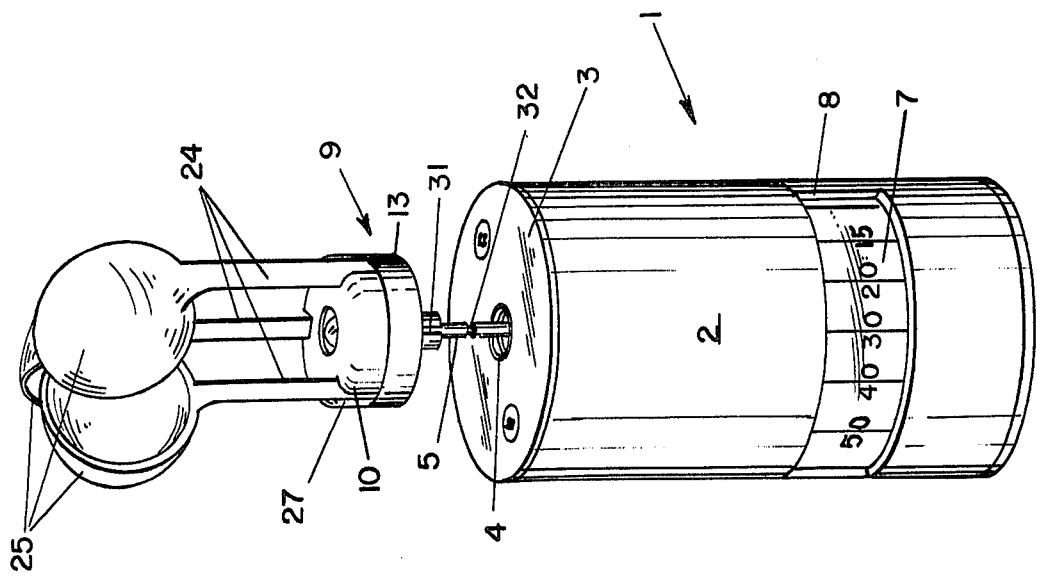
FIG. 2 is a perspective view with the rotor arms in inactive collapsed positions.

Referring more particularly to the drawings, wherein similar reference characters designate like parts throughout the several views, numeral 1 refers generally to a relatively small and compact anemometer embodying a cylindrical casing 2 of a size for hand holding when testing wind velocity. While the casing may be of various materials, such as aluminum or suitable plastic, and is illustrated as being cylindrical, it is to be understood that it may assume other suitable shapes or configurations. Suitably arranged and journalled vertically within and projecting centrally through an opening 4 in an upper end wall 3 of casing 2 is an elongated metal spindle or shaft 5. The rotation of spindle 5 is monitored by suitable electronic apparatus 6, not shown, housed within casing 2 and the wind velocity indicated on a calibrated gauge 7 mounted for rotation behind an arcuate window 8, in an obvious manner. As the electrical apparatus is of a conventional type, it is not herein described or illustrated.

Figure 5:
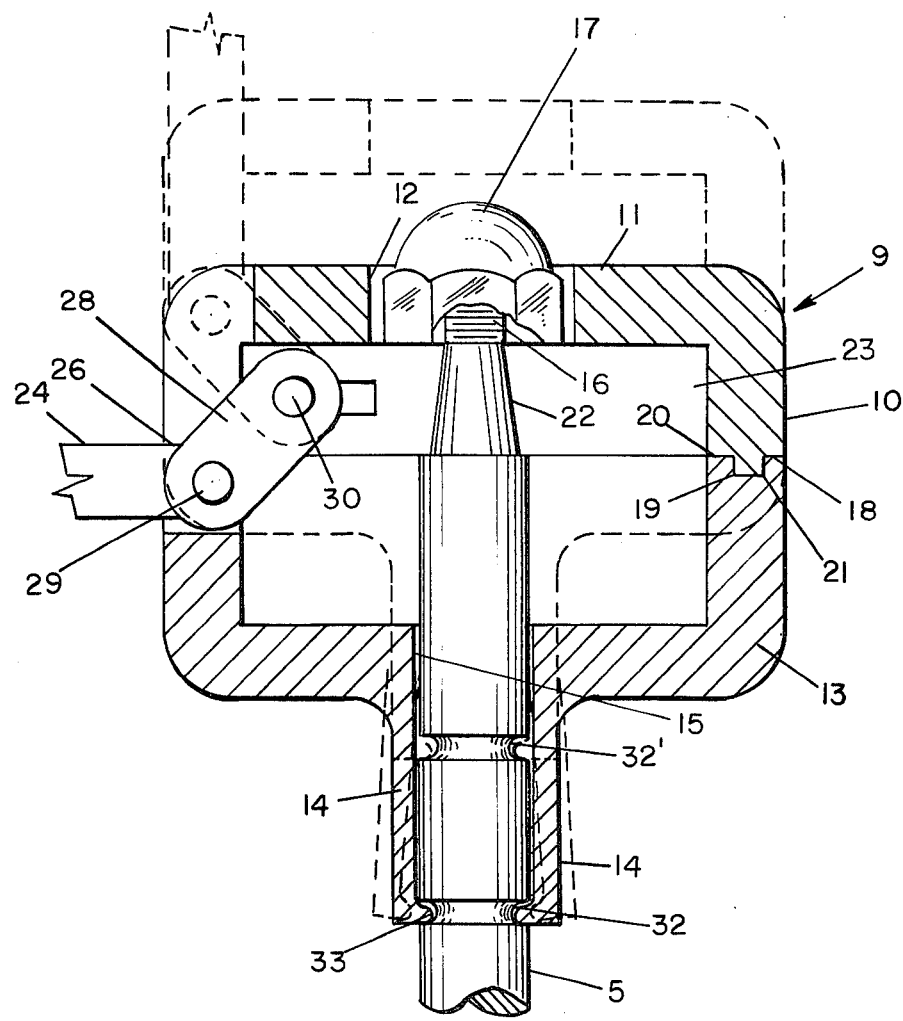
FIG. 5 is a vertical section through the spider assembly cap member showing the active position of one link and rotor arm in full lines, and the inactive collapsed position in dotted lines.
Figure 6:
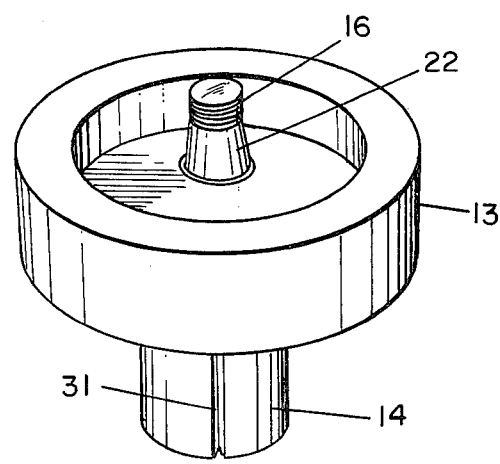
FIG. 6 is a perspective view of the lower case bottom portion of the spider assembly cap member.

A two part plastic cap member 9, best shown in FIG. 5, includes a case top 10 having a central opening 12 in its upper wall 11, and a case bottom 13 formed with a depending tubular hub 14 with a bore 15 extending vertically therethrough. The upper end portion of spindle 5 projects through bore 15 and opening 12 and is exteriorly threaded, as at 16, to receive a suitable lock nut 17 so that the cap member is mounted for sliding vertical movement thereon, as presently to be described. The lower rim 18 of case top 10 is provided with spaced depending pins 19 which mate with recesses 21 in the upper rim 20 of case bottom 13 which serve to retain the two parts in assembled position. Suitably affixed to a reduced upper end 22 on spindle 5 is a spider plate 23 arranged within case top 10.

A set of three plastic radial arms 24, integrally formed with wind cups 25 on the outer ends thereof, have their inner ends 26 projecting through three spaced vertical slots 27 in the side wall of case top 10. Inner ends 26 of arms 24 are pivoted, as at 29, to the lower ends of links 28, in turn pivoted in the lower ends of slots 27 and projecting upwardly and inwardly within the case top 10 at angles of approximately 45°. The upper ends of links 28 are pivoted, as at 30, to spider plate 23.

The tubular hub 14 of case bottom 13 is sleeved over and slidably disposed on spindle 5 so that the cap member 9 is vertically adjustable thereon. Hub 14 is formed with four spaced elongated slots, extending from the case bottom wall 13 to the lower end of the hub, to permit of the latter flexing relative to the spindle. Two spaced annular grooves 32–32' are provided in the upper end portion of spindle 5, and the lower end of hub 14 terminates in an inturned annular interior rounded rib 33 adapted to be received in either the lower groove 32 or the upper groove 32'. By virtue of this slotted arrangement, the hub is formed into four quadrants or sections which will flex laterally and enable the interior rib 33 formed on each to seat within the respective grooves during vertical adjustment. Thus, in the full line active position of the cup arms 24 and links 28 in FIG. 5, the rib 33 will seat within lower groove 32, and when the case top is manually pushed upwardly, relative to spindle 5 and spider plate 23, the rib will cam out of groove 32 and permit lateral outward flexure of the hub to the dotted line position of FIG. 5 and cause the rib to slide upwardly along the annulus of the spindle until it springs inwardly and seats within upper groove 32′. During this upward travel of the case top from grooves 32 and 32′, the cup arms 24 will swing upwardly to their dotted line positions. Downward pressure on the case top will, of course, reverse the aforesaid movements and return the cup arms to their horizontal active positions. In this connection, it will be recognized that the slotting of hub 14 permits of the required flexing thereof. The grooves 32 and 32′ also serve to retain the cup arms in their respective active and inactive positions.

Figure 1:
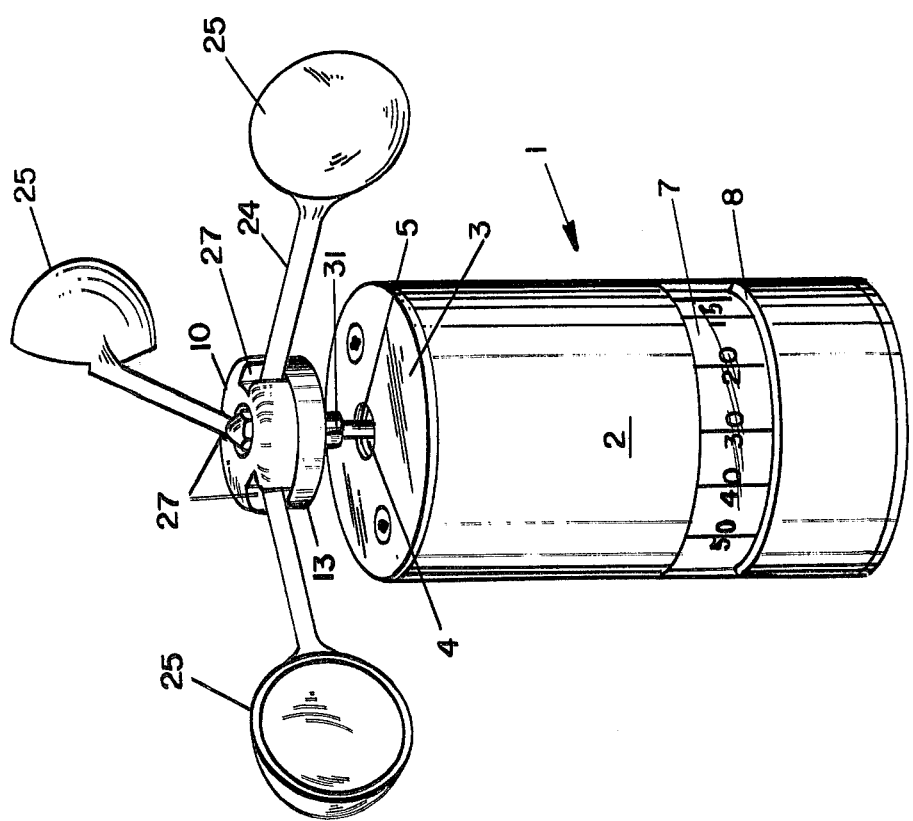
Figure 3:
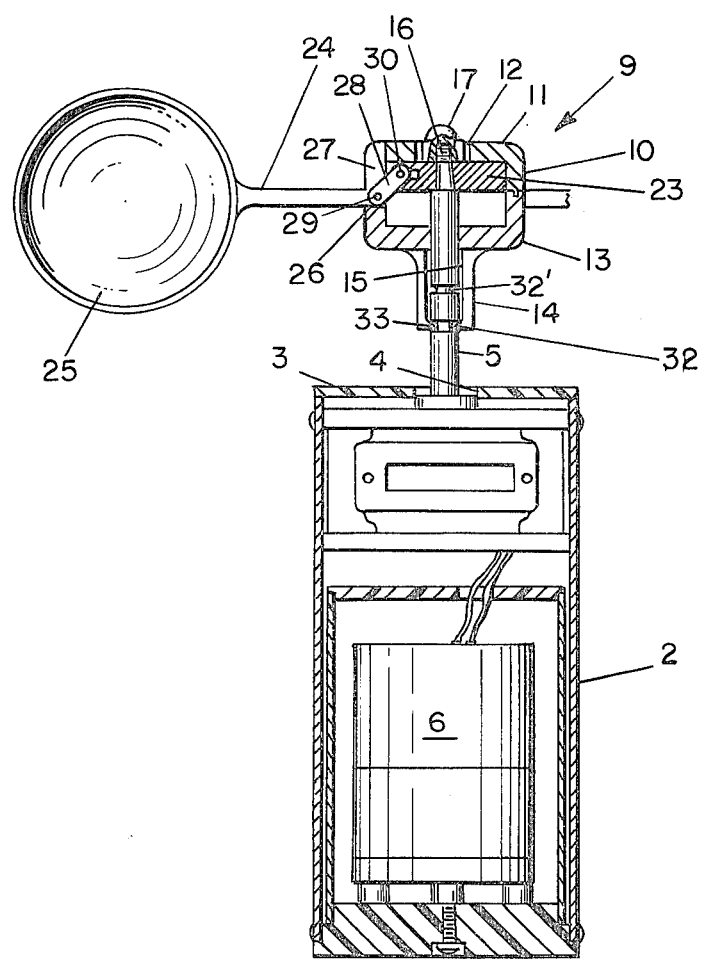
FIG. 3 is a vertical section through the anemometer on the line 3—3 of FIG. 4.
Figure 4:
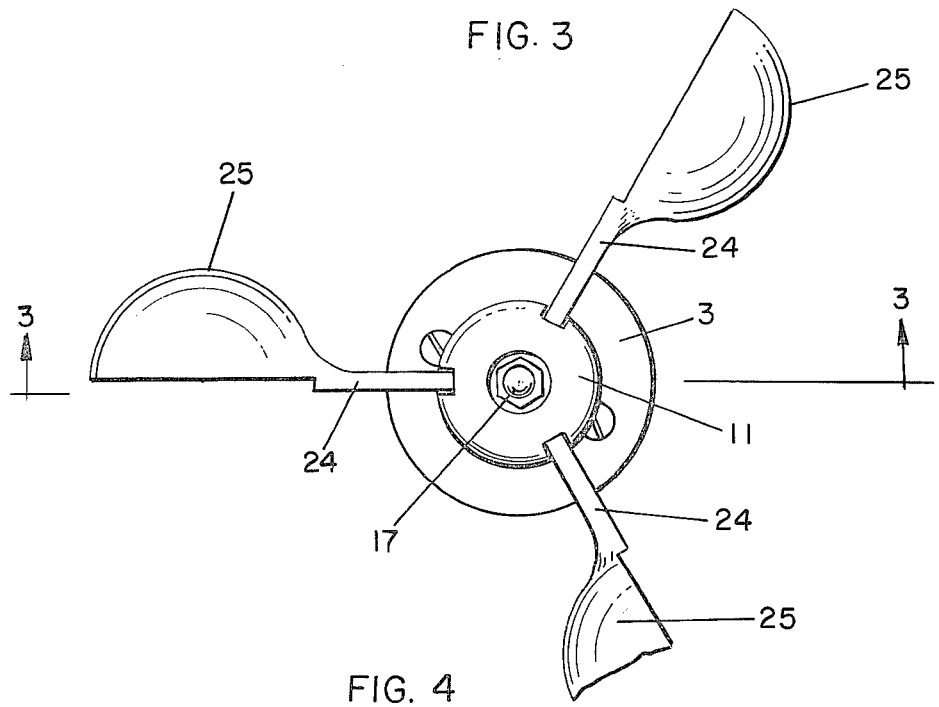
FIG. 4 is a top plan view.

It will be understood that when the cup arms are in their active positions, wind contacting the cups will cause rotation of the arms and enable monitoring of the wind velocity on gauge 7. When storage of the anemometer is desired, the cup arms will be swung from their active FIG. 1 position to the collapsed inactive position of FIG. 2, which permits of the entire assembly being snugly and protectively housed within a suitable case or container, not shown.

While I have shown and described a preferred embodiment of collapsible anemometer, it is to be understood that various changes and improvements may be made therein without departing from the scope and spirit of the appended claims.

What I claim:

1. An anemometer comprising a tubular casing, a spindle journalled in said casing and projecting upwardly therefrom for rotation relative thereto, spaced radial arms pivotally arranged relative to the projected end of said spindle, cupped means on the outer ends of said arms whereby said arms are wind drivingly rotated, and link means pivoted to said spindle and the inner ends of and for moving said arms from active horizontal to inactive collapsed positions relative to said spindle.

2. A anemometer according to claim 1, wherein tubular cap means is slidably mounted on said spindle, and one end of said link means is pivoted to said spindle and the other end thereof is pivoted to said cap means.

3. An anemometer according to claim 1, wherein plate means is fixedly mounted on said spindle, the upper end of said link means is pivoted to said plate means, and the lower end of said link means is pivoted to said tubular cap means.

4. An anemometer according to claim 2, wherein one link means is provided for each arm.

5. An anemometer according to claim 2, wherein said spindle is formed with spaced annular grooves, and said tubular cap means has depending hub means slidably arranged on the said spindle, and means on said hub means selectively engageable with said annular grooves for holding said arms in their active and inactive positions.

6. An anemometer according to claim 5, wherein said hub means is slotted to permit lateral flexure thereof, and the lower end thereof is interiorly ribbed for seating in said annular grooves.

7. An anemometer according to claim 5, wherein said cap means is slotted to accommodate said link means.

* * * * *